Sept. 5, 1967 IKIO OKAZAKI ETAL 3,340,377
METHOD OF TREATING MATERIAL BY A CHARGED BEAM
Filed July 12, 1963 2 Sheets-Sheet 1

INVENTORS
Ikio Okazaki
BY Kazumitsu Tanaka
Webb Mackey & Burden
THEIR ATTORNEYS

United States Patent Office 3,340,377
Patented Sept. 5, 1967

3,340,377
METHOD OF TREATING MATERIAL BY A CHARGED BEAM
Ikio Okazaki, Musashino-shi, Tokyo, and Kazumitsu Tanaka, Mitaka-shi, Tokyo, Japan, assignors to Nihon Denshi Kabushiki Kaisha, Tokyo, Japan, a corporation of Japan
Filed July 12, 1963, Ser. No. 294,469
Claims priority, application Japan, July 12, 1962, 37/29,270
8 Claims. (Cl. 219—50)

ABSTRACT OF THE DISCLOSURE

A method of treating a specimen of a material with a charged beam by placing a shield over the specimen where the shield vaporizes when heated to form a hole through which only a portion of the beam passes to act upon the specimen.

It has heretofore been proposed to treat a material or specimen, for example, the forming of grooves in a surface of a specimen or the boring of a specimen, by projecting onto the surface of the specimen a charged beam such as an electron beam or an ion beam.

Thus, grooves or bores can be formed in the surface of a specimen by focusing an electron beam so that the portion of the beam of minimum cross section falls on the surface of the specimen. The beam or the specimen are moved relatively to each other in order to obtain the desired configuration on the surface of the specimen. This method of treating a specimen is particularly useful for producing miniaturized electronic parts, such as resistors, by grooving metal films. Since miniaturized parts are produced, it is important that they be manufactured with a high degree of accuracy.

It has not heretofore been possible to obtain high accuracy in the production of parts by bombardment by a charged beam of the surface of a specimen for a number of reasons. First, the energy of the charged beam spreads from the center of the axis of the beam in all directions in a plane at right angles to the axis of a beam. As a result, the portion of the surface of the material on which the charged beam impinges does not have a definite outline. The center of the region bombarded by the charged beam is heated more than other parts of the region, and the temperature of the bombarded surface varies from place to place on that surface.

The temperature distribution of the surface in the bombarded region varies further because the control over the focusing of the charged beam varies indirectly as the distance between the beam focusing system and the surface of the material being treated, and it is generally the practice to maintain a relatively large distance between the focusing system of the beam and the surface of the specimen in order to provide for observation of the process as it proceeds.

The difficulties in obtaining accuracy of the outline of a bore or groove are increased if the material of the specimen being treated is a good conductor of heat. If the specimen is a good conductor of heat, the amount of heat transferred from the region of the specimen being treated affects greatly the amount of heat retained, and a bore or groove being cut in the surface of a specimen may be filled with melted particles even though the treated surface is bombarded by a sharply focused beam. If the intensity of the charged beam is increased, a bore or groove is formed which is considerably larger than the dimensions of the charged beam which is focused on the surface of the material being treated.

If the specimen is a nonconductor of electricity, bombardment by the charged beam builds up a charge which is the same as the charge of the beam, and the accumulated charge disturbs the shape of the beam which impinges on the surface being treated. This distortion of the shape of the beam is increased if particles which have been melted as a result of the bombardment are thrown out of the bore or groove and accumulate on the surface being treated. This distortion will increase as treatment continues because it is cumulative.

The difficulties outlined above in obtaining bores or grooves in a treated specimen are increased if the specimen is of such material that bombardment by a charged beam creates metal oxides which adhere to the surface of the specimen being treated. The difficulties also increase if the specimen is relatively thin, i.e., if, for example, the specimen is metal foil. If such specimens are treated, heat is conducted away from the region being treated, and since the region being treated is highly heated, local thermal expansion occurs in a direction towards the surface being treated and the specimen cannot be used.

For the foregoing reasons, it has been impossible to treat specimens accurately so as to produce grooves of uniform width in the specimen or bores with clearly defined outlines.

We have invented a method of treating specimens by bombardment by a charged beam which avoids the foregoing difficulties. By our method, the specimen is bombarded only by the portion of the charged beam in which the heat energy is concentrated. This is accomplished by placing a shield on the surface of the specimen which is to be bombarded. This shield also concentrates the shape of the charged beam immediately above the surface which is bombarded.

Also in accordance with our invention, we prevent distortion of the shape of the charged beam due to the build-up of a charge on the surface being treated by placing a layer of electrically conducting material on the surface of the shield. We also eliminate unnecessary heat in the surface of the specimen by placing the surface being treated in contact with a good heat conductor. Our invention further includes a method for efficiently bombarding a single specimen a number of times by forming a bore or groove in a shield in advance of treatment and by shifting the shield or the specimen relatively to each other.

In the accomapnying drawings, we have illustrated certain presently preferred embodiments of our invention in which:

FIGURE 1b is a graph showing the distribution of heat in the surface of a specimen bombarded by a charged beam having the energy distribution illustrated in FIGURE 1a;

FIGURE 3b is a graph showing the distribution of heat in the surface of the specimen when it has been bombarded with a beam having the energy distribution shown in FIGURE 3a;

FIGURES 4 to 9, inclusive, are diagrams illustrating other embodiments of our invention.

Figure 1A:
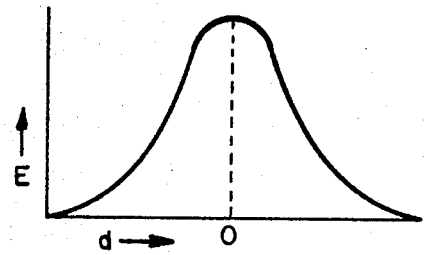
FIGURE 1a is a graph showing the energy distribution of a charged beam when it impinges upon the surface of a specimen in accordance with methods heretofore used.

FIGURE 1a is a graph showing the distribution of the energy of a charged beam as it impinges upon the surface of a specimen in accordance with prior practice. In the graph, the point 0 on the abscissa represents the point on the surface of the specimen which is struck by the central axis of the charged beam, and the relative amount of energy received at this point and by areas of the surface removed from this point are plotted as ordinates.

Figure 1B:
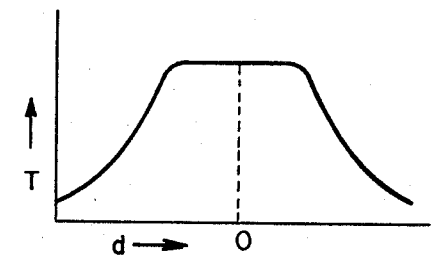

FIGURE 1b shows the distribution of heat in the specimen which has been bombarded by a charged beam having the energy distribution shown in FIGURE 1a. In the graph, the point on the abscissa marked 0 indicates the point where the central axis of the charged beam impinges upon the surface of the specimen and the relative temperature of the specimen at this point and in areas removed from this point are plotted as ordinates. Comparing FIGURE 1a and FIGURE 1b it will be seen that the distribution of heat created by bombardment by the charged beam is considerably wider than the energy of the charged beam as it impinges upon the surface of the specimen.

Figure 2:
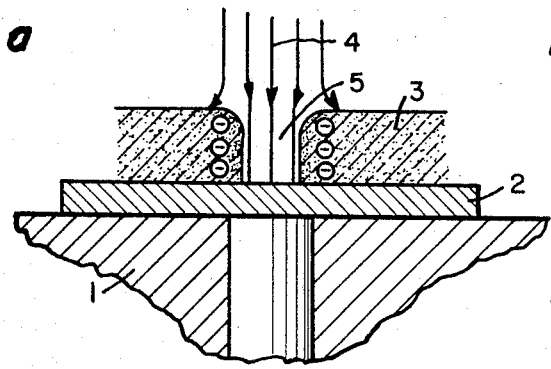
FIGURE 2 is a diagrammatic illustration of one embodiment of our invention.

FIGURE 2 illustrates one embodiment of our invention. A stage 1 supports a specimen 2 which is to be treated, i.e., a specimen in which grooves or bores are to be formed. A shield 3 made of a material different from the specimen 2, e.g., a quartz plate, is placed on top of the specimen. A charged beam, for example, an electron beam or an ion beam, is directed onto the shield 3 and forms a bore 5 in the quartz plate and the desired bore in the specimen 2.

The use of the quartz shield 3 produces several important results. First, when the quartz is subjected to a charged beam, it is heated to such a temperature that it vaporizes, as a consequence of which no melted material accumulates around or in the bore 5, or the bore of the specimen. Second, since quartz cannot be bored except by a charged beam of relatively high energy, only the central part of the beam having the highest energy reaches the specimen and only that part of the specimen which is bombarded by the central part of the charged beam is bored. Third, the portions of the shield 3 which surround the bore 5 are charged with the same sign as the charged beam, and this static charge built up on the shield 3 condenses the charged beam which passes through the bore 5 because electrical charges of like sign repel each other.

Materials other than quartz can be used for the shield 3. The only requirement is that the shield be made of a material different from that of the specimen and that it vaporize when heated by a charged beam. We have found, however, the quartz is especially suitable.

Figure 3A:
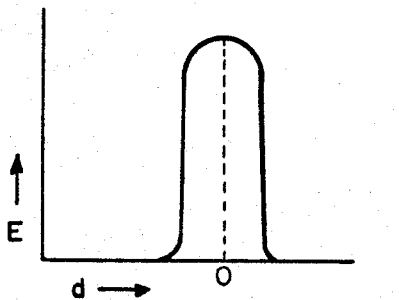
FIGURE 3a is a graph showing the energy distribution of a charged beam when it impinges upon the surface of a specimen in accordance with our invention.
Figure 3B:
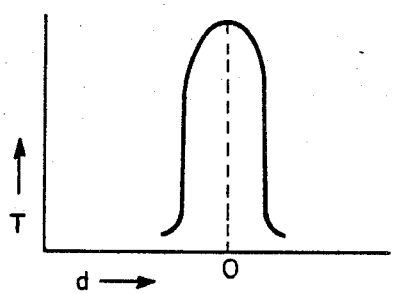

FIGURES 3 and b are graphs similar to FIGURES 1a and b but show the distribution of energy and temperature, respectively, on the surface of a specimen which has been bombarded by a charged beam but protected by a shield as described with reference to FIGURE 2. It will be noted from FIGURE 3a that only the portion of the specimen on which the axis of the charged beam impinges receives more energy than other areas of the specimen actually reached by the beam and that the difference in energy received is relatively slight. As shown in FIGURE 3b the distribution of heat in the surface of the specimen is likewise concentrated with the result that a bore is formed in the specimen which has the same dimensions as the cross-sectional dimensions of the charged beam directed towards the specimen. Bores and grooves in the treated specimens having the desired dimensions are thereby obtained and localized thermal expansion referred to above is avoided.

Figure 4:
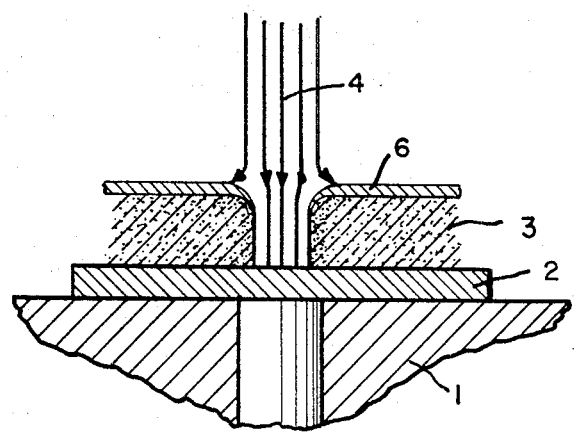

We have found that better results than those obtained using the method illustrated in FIGURE 2 can be obtained if the shield 3 is covered with a sheet of material having good electrical conductivity. This is illustrated in FIGURE 4 in which the quartz shield 3 is covered by a good electrically conductive sheet 6 which is grounded. The electrically conductive sheet 6, since it is grounded, prevents an accumulation of electrical charge on the quartz shield 3 and disturbance of the shape of the electron beam is avoided.

Figure 5:
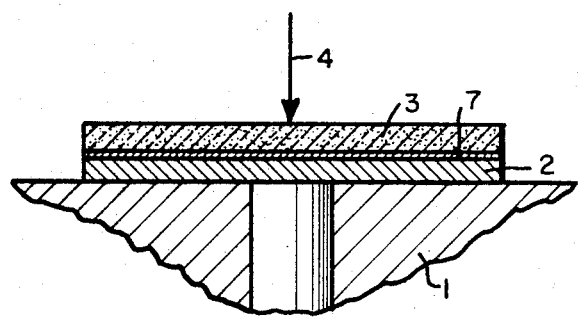

A further modification of our invention is illustrated in FIGURE 5. In accordance with the method there illustrated, a sheet 7 of material having good thermal conductivity is placed between the specimen 2 and the quartz shield 3. The heat conducting sheet 7 carries off excess heat developed in the specimen 2 as a result of bombardment by the charged beam.

If several operations are to be performed on one specimen, it is desirable in the interest of efficiency to maintain the positions of the charged beam and the shield constant and to shift the specimen alone or the specimen and a heat conducting sheet relative to the shield. A single bore or groove cut in the shield can be used many times, and bores or grooves having the contour of the bore or groove to be formed in the specimen can be formed in the shield in advance.

Figure 6:
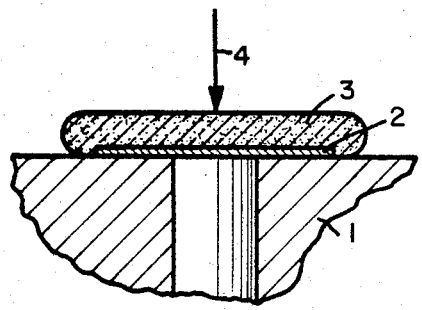
Figure 7:
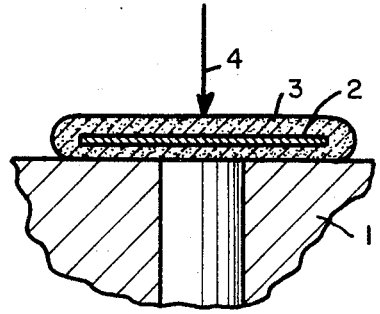

FIGURES 6 and 7 illustrate methods for treating very thin specimens, such as foil. As shown in these figures, the quartz shield 3 may surround one side (FIGURE 6) or both sides (FIGURE 7) of the specimen. It is necessary, of course, to adjust the intensity of the charged beam according to the thickness of the specimen. Thereby, localized expansion of portions of the specimen can be eliminated.

Figure 8:
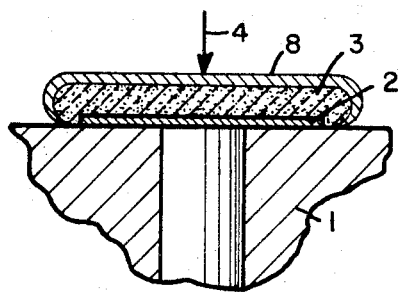
Figure 9:
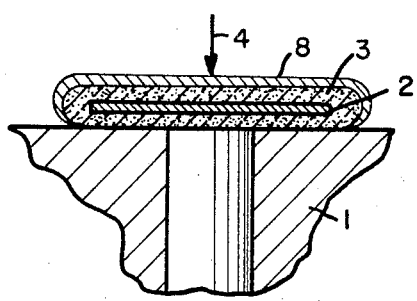

The methods shown in FIGURES 6 and 7 can be used with good results on both thick and thin material by covering the surface of the shield which is exposed to the charged beam with a sheet 8 of electrically conductive material as shown in FIGURES 8 and 9. It is not necessary to use a sheet of material having good thermal conductivity.

While we have illustrated certain presently preferred embodiments of our invention, it is to be understood that it may be otherwise variously embodied within the scope of the appended claims.

We claim:
1. A method of treating material by a charged beam to form bores, grooves and the like in a surface of a specimen of the material which comprises,
  (A) Forming in a shield on the specimen a hole having the contour of the bore, groove and the like to be formed in the surface of the specimen, said hole being formed by said charged beam and having a cross-sectional area less than the cross-sectional area of the charged beam, said shield being of a material which is different from that of the specimen and which vaporizes when heated, and
  (B) Bombarding the surface of the specimen with a charged beam through said hole formed in the shield.
2. A method of treating material by a charged beam as described in claim 1 in which said shield is made of quartz.
3. A method of treating material by a charged beam as described in claim 1 in which a sheet of electrically conductive material is placed on the surface of the shield which is exposed to the charged beam and in which said sheet is grounded.
4. A method of treating material by a charged beam as described in claim 1 and in which a sheet of material having good thermal conductivity is placed between the shield and the specimen and in contact with the specimen.
5. A method of treating material by a charged beam as described in claim 1 in which the shield covers the entire side of the specimen which is exposed to the charged beam.
6. A method of treating material by a charged beam as described in claim 1 in which the shield covers both sides of the specimen to be treated.
7. A method of treating material by a charged beam which comprises,
  (A) Placing on the surface of the specimen to be treated a shield of a material which vaporizes when heated and which is different from the material of the specimen,
  (B) Bombarding the shield with the charged beam to form a hole in the shield, said hole being of a cross-sectional area substantially the same as the cross-sec- tional area of the high density portion of the charged beam, and (C) Bombarding the surface to be treated with the charged beam through the hole formed in the shield, whereby only the high density portion of the beam strikes the specimen.

8. A method of treating material by a charged beam which comprises:

(A) placing on the surface of the specimen to be treated a shield of a material that vaporizes when heated and that is of a material different from the specimen, said shield having a hole in which the cross-sectional area is substantially the same as the cross-sectional area of the high density portion of the charged beam, said hole having been formed by the high density portion of a charged beam; and (B) bombarding the surface to be treated with the high density portion of the charged beam through the hole in said shield.

References Cited

UNITED STATES PATENTS 3,028,491   4/1962   Schleich.
3,118,050   1/1964   Hetherington _____ 219—117

OTHER REFERENCES

Practical Electron Beam Cutting and Milling Applications, by The American Society of Tool and Manufacturing Engineers, Raymond F. Duhamel, p. 9, 1962.

RICHARD M. WOOD, *Primary Examiner.*

B. A. STEIN, *Assistant Examiner.*